(12) United States Patent
Ghia et al.

(10) Patent No.: US 6,911,842 B1
(45) Date of Patent: Jun. 28, 2005

(54) LOW JITTER CLOCK FOR A PHYSICAL MEDIA ACCESS SUBLAYER ON A FIELD PROGRAMMABLE GATE ARRAY

(75) Inventors: Atul V. Ghia, San Jose, CA (US); Vasisht M. Vadi, Mountain View, CA (US); Adebabay M. Bekele, San Jose, CA (US); Philip D. Costello, San Jose, CA (US); Hare K. Verma, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 418 days.

(21) Appl. No.: 10/090,239

(22) Filed: Mar. 1, 2002

(51) Int. Cl.$^7$ ............................................. H03K 19/77
(52) U.S. Cl. ............................. 326/41; 326/38; 326/47
(58) Field of Search ..................................... 326/38–41

(56) References Cited

U.S. PATENT DOCUMENTS 5,260,611 A 11/1993 Cliff et al.
5,446,914 A 8/1995 Paul et al.
6,133,750 A 10/2000 Chan et al.

FOREIGN PATENT DOCUMENTS

EP 0 575 050 A1 12/1993
EP 0 596 658 A1 5/1994

*Primary Examiner*—Anh Tran
(74) *Attorney, Agent, or Firm*—E. Eric Hoffman (57) ABSTRACT

A programmable logic device (PLD) is provided that supports multi-gigabit transceivers (MGTs). The PLD includes one or more pairs of shared clock pads for receiving one or more high-quality differential clock signals. Dedicated clock traces couple each pair of shared clock pads to one or more MGTs on the PLD. Each MGT includes a clock multiplexer circuit, which allows one of the high-quality differential clock signals to be routed as a reference clock signal for the MGT. The clock multiplexer circuits are designed such that no significant jitter is added to the high-quality clock signals. The clock multiplexer circuits can also route general-purpose clock signals received by the PLD as lower quality reference clock signals for the MGTs. The reference clock signal routed by the clock multiplexer circuit can be stepped down to provide a reference clock for a physical coding sublayer of the MGT.

58 Claims, 4 Drawing Sheets

LOW JITTER CLOCK FOR A PHYSICAL MEDIA ACCESS SUBLAYER ON A FIELD PROGRAMMABLE GATE ARRAY

BACKGROUND OF THE INVENTION

1. Field of the Invention

The present invention relates to multi-gigabit transceivers (MGTS) located on a programmable logic device (PLD), such as a field programmable gate array (FPGA). More specifically, the present invention relates to a method and apparatus for providing low jitter clock signals for use in the operation of an MGT on a PLD.

2. Related Art

Figure 1:
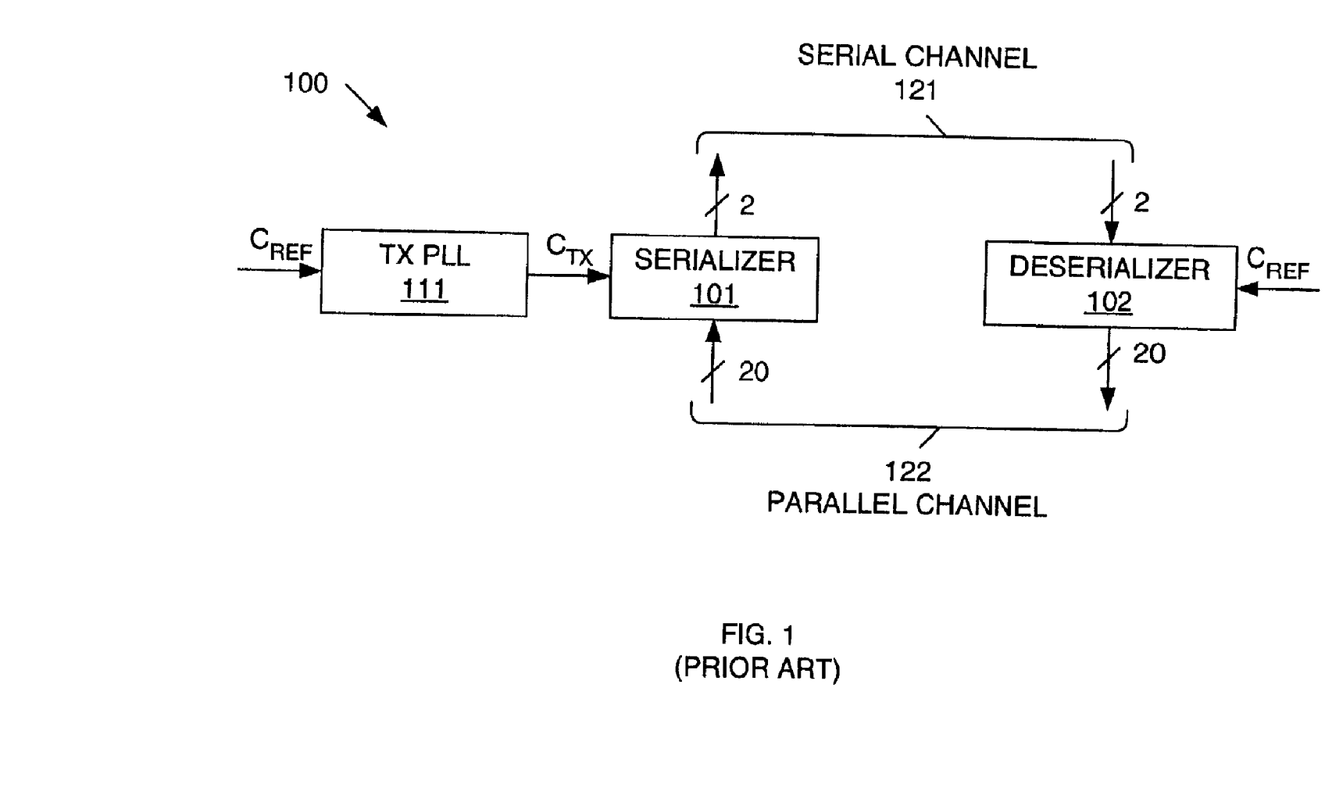
FIG. 1 is a block diagram of a portion of a conventional multi-gigabit transceiver.

FIG. 1 is a simplified block diagram of a portion of a conventional multi-gigabit transceiver (MGT) 100. The illustrated elements of MGT 100 include serializer 101, deserializer 102 and transmit phase locked loop (PLL) 111. It is understood by those of ordinary skill that conventional MGT 100 includes many other elements in addition to those illustrated in FIG. 1.

In general, MGT 100 operates as an input/output (I/O) interface between serial channel 121 and parallel channel 122. Thus, parallel data (N-bits wide in the described example) is provided to serializer 101 at a first frequency. For example, 20-bit data values can be provided to serializer 101 in response to a reference clock signal $C_{REF}$ having a frequency of 156.25 MHz. Transmit PLL 111 generates a clock signal $C_{TX}$ having a frequency N/2 times greater than the reference clock signal $C_{REF}$. Thus, in the described example, clock signal $C_{TX}$ has a frequency ten times greater than $C_{REF}$, or 1.5625 GHz. Note that the feedback clock signal provided to transmit PLL 111 is not shown in FIG. 1. Serializer 101 serializes the 20-bit input data values using multiplexed timing in response to the clock signal $C_{TX}$, thereby providing a serial differential output data stream at a data rate of 3.125 gigabits per second (Gbps). Note that a serial differential data stream consists of 2 signals.

Similarly, deserializer 102 receives a serial differential input data stream at a data rate of 3.125 Gbps. Deserializer 102 samples the serial differential input data stream at the frequency of the $C_{REF}$ signal, thereby providing a 20-bit wide parallel output data stream at a frequency of 156.25 MHz.

The quality of the reference clock signal $C_{REF}$ determines the operational bandwidth of MGT 100. As the jitter present in the reference clock signal $C_{REF}$ increases, the accuracy of the clock signal $C_{TX}$ generated by transmit PLL 111 decreases, thereby reducing the operational bandwidth of MGT 100. For example, reference clock $C_{REF}$ must exhibit jitter of 40 picoseconds peak-to-peak or less to allow MGT 100 to operate at a data rate range of 500 Mbps to 3.125 Gbps. MGT 100 would be limited to smaller frequency ranges when using reference clock signals exhibiting greater jitter.

Programmable logic devices (PLDs), such as field programmable gate arrays (FPGAs), have not previously included MGTs. One reason for this is that the clock routing systems used by PLDs do not typically provide clock signals having jitter low enough to support multi-gigabit operation. The clock signals used by the I/O circuitry of PLDs typically have a significant amount of jitter based on the fact that these clock signals are typically stepped down from a relatively high I/O voltage (e.g., a 2.5 Volt level) to a relatively low core voltage (e.g., a 1.5 Volt level), and then stepped back up to the relatively high I/O voltage level. These stepping down and stepping up processes add an unacceptable amount of jitter to the clock signals.

It would therefore be desirable to have a novel clocking scheme in a programmable logic device capable of supporting multi-gigabit transceivers.

SUMMARY

Accordingly, the present invention provides a PLD, such as an FPGA, that supports one or more MGTs. In accordance with one embodiment, a PLD includes one or more pairs of shared clock pads for receiving one or more high-quality differential clock signals, each having a peak voltage corresponding with the I/O supply voltage (e.g. 2.5 Volts). Dedicated routing resources are provided to route the clock signals to one or more MGTs on the PLD. In one embodiment, the dedicated routing resources include a differential buffer connected to a pair of the shared clock pads, wherein the differential buffer converts a received differential clock signal to a single-ended clock signal. The dedicated routing resources also include a dedicated clock trace that routes the single-ended clock signal from the differential buffer to one or more MGTS. Each of the MGTS includes a clock multiplexer circuit, which allows one of the high-quality input differential clock signals to be routed as a reference clock signal for the MGT. The clock multiplexer circuits are designed such that no significant jitter is added to the high-quality clock signals routed through the clock multiplexer circuits.

The PLD also includes general-purpose clock pads for receiving one or more general-purpose clock signals. These general-purpose clock signals are stepped down from the I/O supply voltage level to the core logic supply voltage level, and routed to the clock multiplexer circuits of the MGTs on the standard global clock routing circuitry of the PLD. The clock multiplexer circuits also allow the general-purpose clock signals to be routed as reference clock signals for the MGTs. The clock multiplexer circuits include up-level shifters for stepping up the general-purpose clock signals from the core logic supply voltage level to the I/O supply voltage level. While the general-purpose clock signals provide reference clock signals having higher jitter than the high-quality differential clock signals, allowing for the use of the general-purpose clock signals advantageously increases the flexibility of the MGT. That is, a designer can choose to use a less expensive clock source, or may choose to use either single-ended or differential clock signals when using the general-purpose clock pads.

In addition to the clock multiplexer circuitry, each MGT includes a physical media access (PMA) sublayer and a physical coding sublayer (PCS). As described above, the clock multiplexer circuitry routes one of the high-quality differential clock signals or general-purpose clock signals as a reference clock signal. This reference clock signal is used to control the serializing and deserializing of data within the PMA. This reference clock signal is also stepped down to the core logic supply voltage level by a down-level shifter to provide a PCS reference clock signal that controls the PCS. The down-level shifter advantageously adds a slight delay to the reference clock signal, such that the PCS reference clock signal is able to eliminate hold time issues on the data flowing from the PCS to the PMA.

The present invention will be more fully understood in view of the following description and drawings.

DETAILED DESCRIPTION

Figure 2:
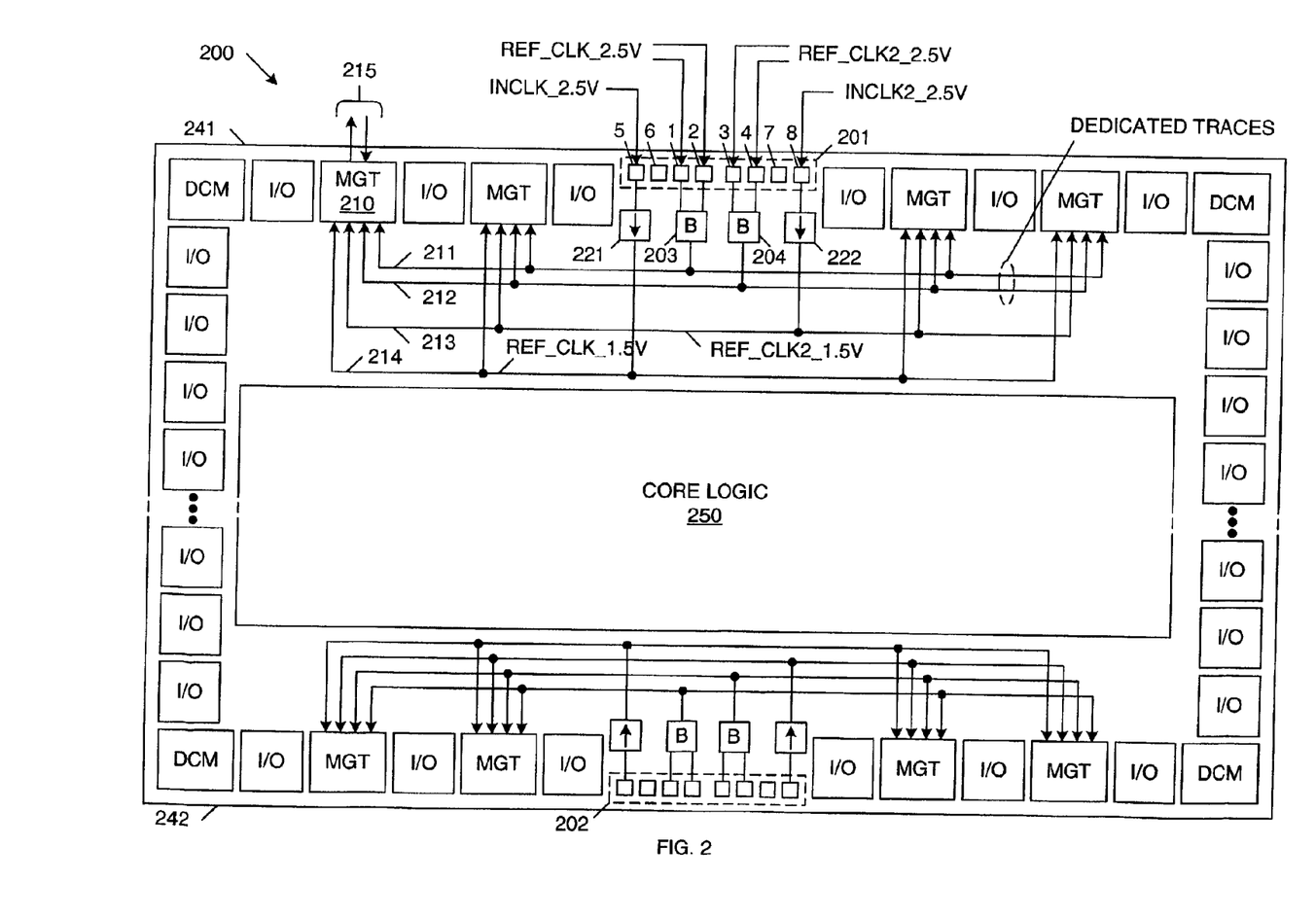
FIG. 2 is a block diagram of a programmable logic device in accordance with one embodiment of the present invention.

FIG. 2 is a block diagram of a programmable logic device (PLD) 200 in accordance with one embodiment of the present invention. In the described embodiment, PLD 200 is a field programmable gate array (FPGA) that includes select I/O blocks (labeled I/O), digital clock managers (labeled DCM) and multi-gigabit transceivers (labeled MGT) located around the perimeter of the device (i.e., the I/O region). PLD 200 also includes core logic 250 (i.e., the core region), which includes an array of configurable logic blocks (CLBs) and programmable routing circuitry, in the described embodiment. Select I/O blocks, digital clock managers and core logic are well known to those of ordinary skill in the art. These elements of PLD 200 are described in detail in "Virtex™-II Platform FPGA Handbook", December 2000, pp 33–75, available from Xilinx Inc., 2100 Logic Drive, San Jose, Calif. 95124.

Elements in the I/O region operate in response to an I/O supply voltage, and elements in the core region are operated in response to a core supply voltage. The I/O supply voltage is greater than the core supply voltage. In the described embodiment, the I/0 supply voltage has a nominal voltage of 2.5 Volts, and the core supply voltage has a nominal voltage of 1.5 Volts. The transistors in the I/O region are fabricated to have relatively thick gate oxides, and the transistors in the core region are fabricated to have relatively thin gate oxides.

A set of eight clock pads 201 is located at the middle of edge 241 of PLD 200. The four centrally located clock pads 1–4 of set 201 are shared clock pads in accordance with the present invention. That is, these shared clock pads 1–4 can be used either as high quality differential input pads, or as general-purpose clock pads. The remaining four clock pads in set 201, including clock pads 5–8, are conventional general-purpose clock pads that are coupled to the global clock routing resources of PLD 200. These global clock routing resources are well known to those of ordinary skill in the art. All eight clock pads 201 can be coupled to receive clock signals, which are distributed throughout the entire PLD. Alternately, the eight clock pads 201 can be used as general I/O pads. Although set 201 includes eight clock pads in the described example, other numbers of clock pads can be used in other embodiments. Moreover, although set 201 includes four shared clock pads and four general-purpose clock pads, other allocations can be used in other embodiments.

Shared clock pads 1–4 are different from general-purpose clock pads 5–8 because the shared clock pads 1–4 are directly connected to dedicated routing structures. More specifically, shared clock pads 1–2 are connected to a dedicated routing structure that includes differential buffer 203 and dedicated clock trace 211. Similarly, shared clock pads 3–4 are connected to a dedicated routing structure that includes differential buffer 204 and dedicated clock trace 212. The dedicated clock traces 211–212 are directly connected to each of the MGTs along edge 241 of PLD 200. Dedicated clock traces 211–212 provide a direct, high-quality, low-distortion path between shared clock pads 1–4 and the MGTs. In the described embodiment, shared clock pads 1–2 (or 3–4) can be connected to receive a high-quality 2.5 Volt differential clock signal from a source located external to PLD 200. For example, 2.5 Volt differential clock signal having a frequency of 156.25 MHz and a jitter of less than 40 picoseconds peak-to-peak can be applied to shared clock pads 1–2 from a clock generation circuit commonly available from Seiko Epson Corp. as part number EG2121CA. This high-quality 2.5 Volt differential clock signal is routed to differential buffer 203. Differential buffer 203 converts the high-quality 2.5 Volt differential clock signal to a high-quality 2.5 Volt single-ended clock signal. Differential buffer 203, which is a conventional element, does not shift the voltage level of the received clock signal, and does not add significant jitter to the received clock signal. The resultant 2.5 Volt single-ended clock signal is routed to the MGTS along edge 241 of PLD 200. Note that the differential clock signals and the corresponding single-ended clock signals are identified by the same names.

In the described example, general-purpose clock pads 5 and 8 are coupled to down-level shifters 221 and 222, respectively, of the global clock routing circuitry. (Although each of clock pads 1–8 is coupled to the general clock routing circuitry, these connections are not shown for purposes of clarity.) In the described example, down-level shifters 221–222 convert 2.5 Volt signals to 1.5 Volt signals. That is, down-level shifters 221–222 convert signals at the I/O supply voltage level to signals at the core logic supply voltage level. Thus, down-level shifters 221 and 222 reduce the voltage swing of received 2.5 Volt clock signals to a 1.5 Volt level. It is understood that any of the shared clock pads 1–4 or the four general-purpose clock pads 5–8 can be connected to down-level shifters in this manner. Down-level shifters 221 and 222 are coupled to global routing traces 213 and 214, respectively, which are part of the global routing resources of the device. These global routing traces 213 and 214 are connected to each of the MGTs along edge 241 of PLD 200. The quality of routing paths between general-purpose clock pads 5 and 8 and the MGTs is not as high as the quality of the dedicated traces 211–212 between shared clock pads 1–4 and the MGTs, at least in part because of the jitter introduced by down-level shifters 221–222, and the programmable nature of the global routing traces 213–214. In the described embodiment, general-purpose clock pads 5–8 can be coupled to receive either single-ended or differential reference clock signals, thereby adding flexibility to the system. The clock generation circuits coupled to general-purpose clock pads 5–8 will typically have a lower performance (and lower price), than the clock generation circuits coupled to shared clock pads 1–4.

In the foregoing manner, each of the MGTs along edge 241 can receive up to four reference clock signals from the clock pads in set 201. In the described embodiment, high-quality 2.5 Volt differential reference clock signals REF_CLK_2.5V and REF_CLK2_2.5V are provided to shared clock pads 1–2 and 3–4, respectively, and are routed to the MGTs. In addition, 2.5 Volt reference clock signals INCLK_2.5V and INCLK2_2.5V are provided to general-purpose clock pads 5 and 8, respectively. These reference clock signals INCLK_2.5V and INCLK2_2.5V are converted to 1.5 Volt levels by down-level shifters 221 and 222, respectively, thereby creating 1.5 Volt reference clock signals REF_CLK_1.5V and REF_CLK2_1.5V, respectively. These REF_CLK_1.5V and REF_CLK2_1.5V reference clock signals are provided to each of the MGTs along edge 241 of PLD 200.

The above-described structure along edge 241 of PLD 200 is repeated along the opposing edge 242 of PLD 200 in accordance with one embodiment of the present invention. Thus, a second set of eight clock pads 202 includes four shared clock pads (which are directly connected to MGTs via dedicated routing resources) and four general-purpose clock pads (which can be connected to MGTs via the global clock routing resources). Note that the four shared clock pads in the second set 202 can also be connected to the global clock routing resources.

MGT 210 will now be described in more detail. Although MGT 210 is described, it is understood that the other MGTs of PLD 200 are similar or identical to MGT 210. MGT 210 is coupled to an external, full-duplex differential serial channel 215, which operates at a speed greater than one gigabit per second (Gbps). In the described example, serial channel 215 operates at a data rate of 3.125 Gbps.

Figure 3:
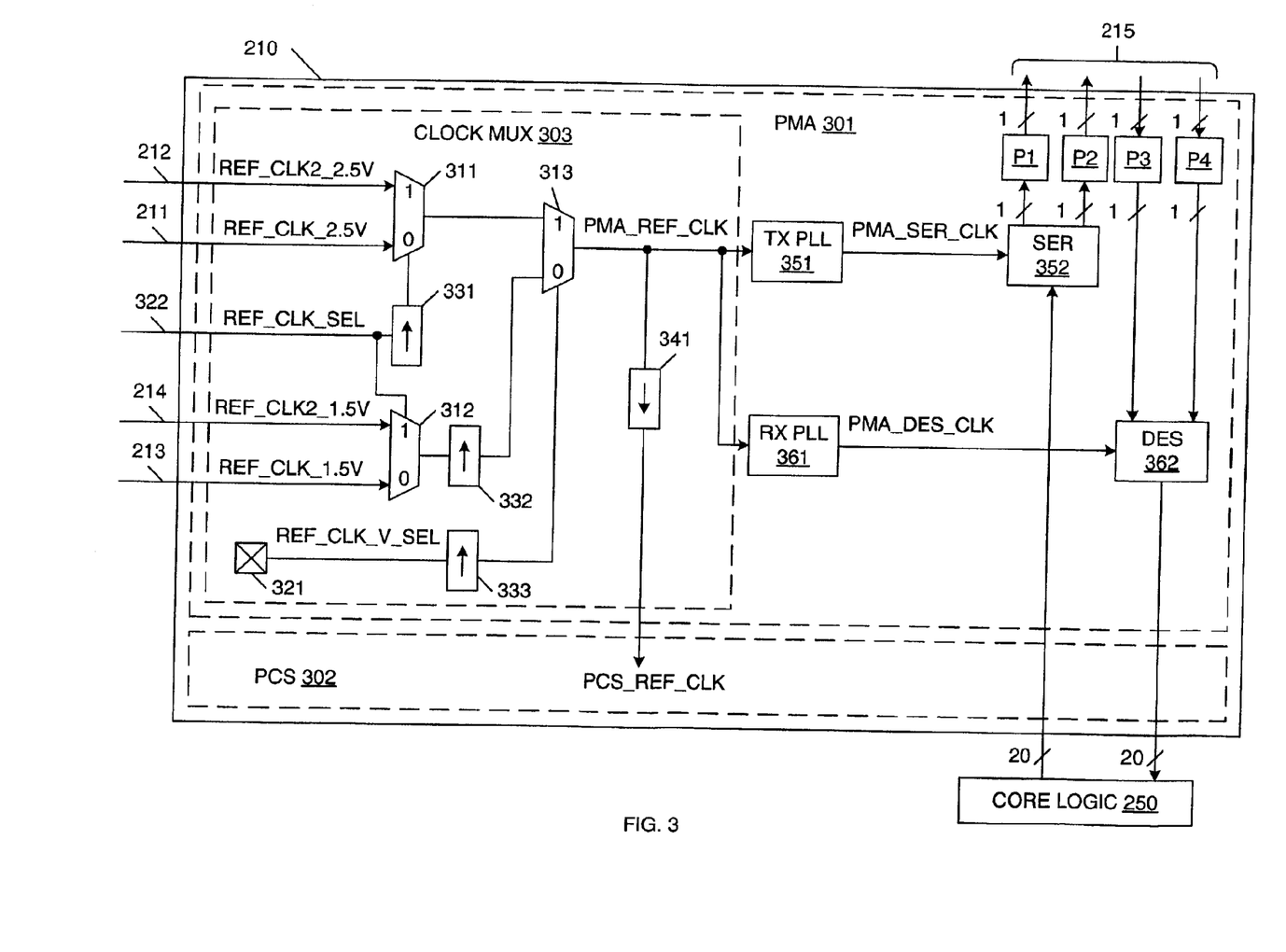
FIG. 3 is a block diagram of a multi-gigabit transceiver in accordance with one embodiment of the present invention.

FIG. 3 is a block diagram of MGT 210 in accordance with one embodiment of the present invention. MGT 210 includes two parts: a high-speed analog serializer-deserializer, known as physical media access (PMA) 301, and a digital part known as the physical coding sublayer (PCS) 302. The high-speed analog serializer-deserializer of PMA 301 includes transmit PLL 351, serializer 352, receive PLL 361, deserializer 362 and pads P1–P4. In accordance with the described embodiment, PMA 301 also includes clock multiplexer circuit 303, which in turn, includes 2-to-1 multiplexers 311–313, configuration memory cell 321, up-level shifters 331–333 and down-level shifter 341. With the exception of clock multiplexer circuit 303, the various elements of MGT 210 are known to those of ordinary skill in the art. For example, one convention MGT is described by "Quad 3.125 Gbps Serial Transceiver", a data sheet for Part No. TLK3104SA provided by Texas Instruments, August 2000, Rev. July 2001.

Clock multiplexer circuit 303 is configured to receive the REF_CLK_2.5V clock signal, the REF_CLK2_2.5V clock signal, the REF_CLK_1.5V clock signal, and the REF_CLK2_1.5V clock signal. More specifically, multiplexer 311 is configured to receive the REF_CLK_2.5V and REF_CLK2_2.5V clock signals from dedicated clock traces 211 and 212, respectively. Multiplexer 312 is configured to receive the REF_CLK_1.5V and REF_CLK2_1.5V clock signals from clock routing paths 213 and 214, respectively.

Multiplexers 311 and 312 are controlled in response to a reference clock select signal (REF_CLK_SEL), which is an input signal provided on line 322 from the core logic fabric 250 to PMA 301. The core logic fabric 250 uses 1.5 Volt signaling. Thus, the REF_CLK_SEL signal is sufficient to switch 1.5 Volt signals through multiplexer 312. Up-level shifter 331 converts the REF_CLK_SEL signal to a 2.5 volt level, thereby enabling this signal to switch 2.5 Volt signals through multiplexer 311.

If the REF_CLK_SEL signal has a logic high "0" value, then multiplexers 311 and 312 pass the REF_CLK_2.5V and REF_CLK_1.5V signals, respectively. Conversely, if the REF_CLK_SEL signal has a logic "1" value, then multiplexers 311 and 312 pass the REF_CLK2_2.5V and REF_CLK2_1.5V signals, respectively.

The signal passed by multiplexer 311 is provided to the "1" input terminal of multiplexer 313. The signal passed by multiplexer 312 is shifted to a 2.5 Volt signal level by up-level shifter 332 and is provided to the "0" input terminal of multiplexer 313.

Multiplexer 313 is controlled in response to a configuration data value (REF_CLK_V_SEL) stored by configuration memory cell 321. Configuration memory cell 321 is a part of the configuration memory array of PLD 200. Configuration memory cell 321 is programmed to store a logic "0" or a logic "1" configuration data value during configuration of PLD 200. The REF_CLK_V_SEL signal stored by configuration memory cell 321 is converted to a 2.5 Volt level by up-level shifter 333, thereby enabling REF_CLK_V_SEL to control the selection of the 2.5 Volt signals applied to multiplexer 313.

If the REF_CLK_V_SEL signal has a logic "0" value, then multiplexer 313 routes the reference clock signal routed by multiplexer 312 (i.e., REF_CLK_1.5V or REF_CLK2_1.5V). Conversely, if the REF_CLK_V_SEL signal has a logic "1" value, then multiplexer 313 routes the reference clock signal routed by multiplexer 311 (i.e., REF_CLK_2.5V or REF_CLK2_2.5V). The clock signal routed by multiplexer 313 is used as a reference clock signal (PMA_REF_CLK) for controlling PMA 301.

Note that if one of the high-quality differential clock signals provided on shared clock pads 1–4 is selected (i.e., REF_CLK_2.5V or REF_CLK2_2.5V), then this clock signal is only routed through two multiplexers 311 and 313. As described in more detail below, these multiplexers 311 and 313 do not introduce a significant amount of jitter to these clock signals. Consequently, the PMA_REF_CLK signal will be a very high quality, low jitter signal when one of the high-quality differential clock signals applied to shared clock pads 1–4 is selected. This will enable MGT 210 to operate with a relatively large frequency bandwidth.

If one of the general-purpose clock signals received on a general-purpose clock pad is selected (e.g., INCLK_2.5V or INCLK1_2.5V), then the selected clock signal is routed through a down-level shifter (e.g., down-level shifter 221 or 222), multiplexers 312–313 and up-level shifter 332. In this case, the down-level shifter and up-level shifter 332 will introduce jitter to the resulting PMA_REF_CLK signal. As a result, MGT 210 will exhibit a slightly smaller frequency bandwidth in response to the general-purpose clock signals.

Although the PMA_REF_CLK signals derived from the general-purpose clock signals (INCLK_2.5V and INCLK2_2.5V) is not of the same high quality as the PMA_REF_CLK signals derived from the clock signals (REF_CLK_2.5V and REF_CLK2_2.5V), the configuration of clock multiplexer 303 advantageously provides flexibility in selecting the PMA_REF_CLK signal from several different sources.

The PMA_REF_CLK signal provided by multiplexer 313 is routed to transmit PLL 351, receive PLL 361 and down-level shifter 341. Down-level shifter 341 converts the 2.5 volt PMA_REF_CLK signal to a 1.5 Volt signal level, thereby creating a reference clock signal (PCS_REF_CLK) for controlling PCS 302. The PCS_REF_CLK signal is used to operate PCS 302 in a manner known to those skilled in the art. Advantageously, down-level shifter 341 adds a small delay, thereby ensuring that the PCS_REF_CLK signal slightly lags the PMA_REF_CLK signal. This advantageously avoids hold time issues on data flowing from PCS 302 to PMA 301.

Transmit PLL 351 generates a serializing clock signal (PMA_SER_CLK) in response to the PMA_REF_CLK signal. Note that the feedback clock signal used by transmit PLL 351 is not illustrated for purposes of clarity. Transmit PLL 351 is configured to generate a PMA_SER_CLK signal that has a frequency N/2 times greater than the frequency of the PMA_REF_CLK signal, where N is the width of the input data bus coupled to core logic 250. In the described embodiment, N is equal to 20. Thus, a 20-bit data value is provided from core logic 250, through PCS 302, to serializer 352. Serializer 352 shifts this 20-bit data value out to pads P1–P2 in a serial manner (as a differential data signal on two lines). Serializer 352 multiplexes out data bits at both rising and falling edges of the PMA_SER_CLK signal in a serial manner. In the present example, the PMA_REF_CLK signal has a frequency of 156.25 MHz, and the PMA_SER_CLK has a frequency of 1.5625 GHz (10 x 156.25 MHz). Thus, 20-bit wide data values would be provided to serializer 352 clocked at a frequency of 156.25 MHz. In response, serializer 352 provides differential serial data to pads P1–P2 at a data rate of 3.125 Gbps. Pads P1–P2 are coupled to full-duplex serial channel 215, which is located external to PLD 200.

Pads P3–P4 are also coupled to serial channel 215. Pads P3–P4 receive differential serial data at a data rate of 3.125 Gbps from serial channel 215. This differential serial data is provided to deserializer 362. Receive PLL 361 provides a deserializing clock signal (PMA_DES_CLK) to deserializer 362. The PMA_DES_CLK signal has the same frequency as the PMA_REF_CLK signal. Deserializer 362 samples the received serial data at the frequency of the PMA_DES_CLK signal, thereby creating 20-bit data values. More specifically, deserializer 362 samples the 3.125 Gbps serial data at a frequency of 156.25 MHz, thereby providing a stream of 20-bit wide data values at a frequency of 156.25 MHz. This data stream is provided to core logic 250 as illustrated.

Figure 4:
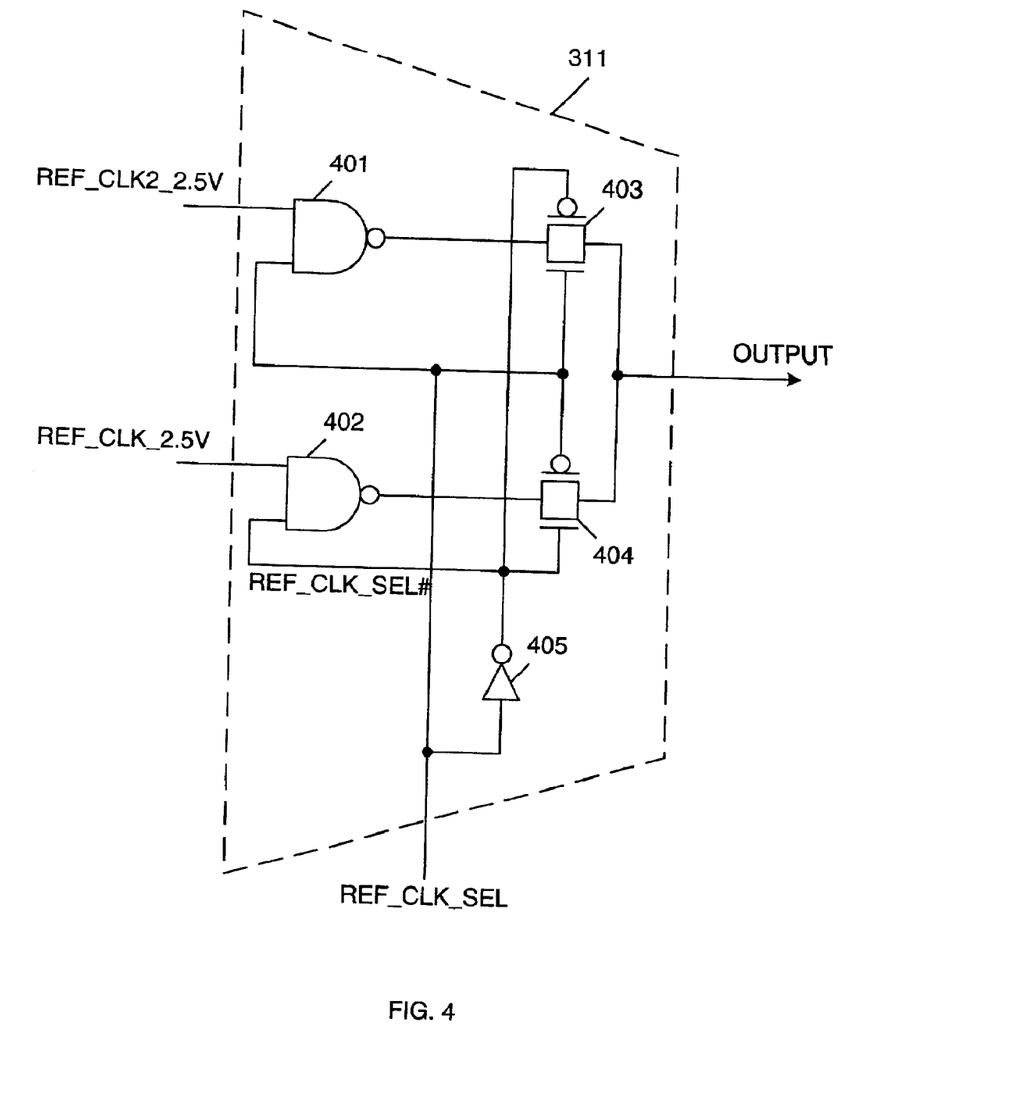
FIG. 4 is a circuit diagram of a clock routing multiplexer in accordance with one embodiment of the present invention.

FIG. 4 is a circuit diagram of multiplexer 311 in accordance with one embodiment of the present invention. In the described embodiment, multiplexers 312 and 313 are identical to multiplexer 311. Multiplexer 311 includes NAND gates 401–402, pass gates 403–404, and inverter 405. Inverter 405 is coupled to receive the REF_CLK_SEL signal, and in response, provides the REF_CLK_SEL# signal. NAND gate 401 is coupled to receive the REF_CLK2_2.5V signal and the REF_CLK_SEL signal. NAND gate 402 is coupled to receive the REF_CLK_2.5V signal and the REF_CLK_SEL# signal. The output terminals of NAND gates 401 and 402 are coupled to input terminals of transmission gates 403 and 404, respectively. Transmission gate 403 includes a p-channel transistor coupled to receive the REF_CLK_SEL# signal, and an n-channel transistor coupled to receive the REF_CLK_SEL signal. Transmission gate 404 includes a p-channel transistor coupled to receive the REF_CLK_SEL signal, and an n-channel transistor coupled to receive the REF_CLK_SEL# signal. The REF_CLK_SEL signal enables one of NAND gates 401–402 and the corresponding transmission gate 403–404. For example, if the REF_CLK_SEL signal has a logic "0" value, then NAND gate 402 and transmission gate 404 are enabled, thereby allowing the inverse of the REF_CLK_2.5V signal to be routed as the OUTPUT clock signal. Advantageously, the logic "0" REF_CLK_SEL signal disables NAND gate 401, thereby de-coupling the REF_CLK2_2.5V signal from transmission gate 403, which is also disabled by the logic "0" REF_CLK_SEL signal. This de-coupling prevents the REF_CLK2_2.5V signal from introducing jitter to the OUTPUT clock signal via transmission gate 403. As a result, multiplexer 311 routes the inverse of the REF_CLK_2.5V clock signal as the OUTPUT clock signal without adding a significant amount of jitter to this clock signal. Multiplexer 311 operates in a similar manner to enable NAND gate 401 and transmission gate 403 (and disable NAND gate 402 and transmission gate 404) when the REF_CLK_SEL signal has a logic "1" value.

Although the invention has been described in connection with several embodiments, it is understood that this invention is not limited to the embodiments disclosed, but is capable of various modifications, which would be apparent to a person skilled in the art. Thus, the invention is limited only by the following claims.

We claim:

1. A programmable logic device comprising:
   programmable input/output circuitry;
   programmable core logic coupled to the programmable input/output circuitry;
   a multi-gigabit transceiver coupled to the programmable core logic;
   a first pair of clock pads;
   a dedicated routing structure directly connecting the first pair of clock pads and the multi-gigabit transceiver; and
   a down-level shifter connected to the dedicated routing structure.

2. The programmable logic device of claim 1, wherein the dedicated routing structure comprises:
   a differential buffer coupled to the first pair of clock pads; and
   a first clock trace providing a direct connection between the differential buffer and the multi-gigabit transceiver.

3. The programmable logic device of claim 1, further comprising:
   a second pair of clock pads; and
   a second dedicated routing structure directly connecting the second pair of clock pads and the multi-gigabit transceiver.

4. The programmable logic device of claim 3, wherein the second dedicated routing structure comprises:
   a second differential buffer coupled to the second pair of clock pads; and
   a second clock trace providing a direct connection between the second differential buffer and the multi-gigabit transceiver.

5. The programmable logic device of claim 4, further comprising a first multiplexer coupled to the first and second clock traces, the first multiplexer being configured to selectively route a clock signal on either the first or second clock trace in response to a select signal.

6. The programmable logic device of claim 5, further comprising a programmable connection between the programmable core logic and the first multiplexer, wherein the programmable core logic provides the select signal to the first multiplexer.

7. The programmable logic device of claim 5, wherein the first multiplexer comprises:
   a first transmission gate configured to be enabled in response to the select signal;
   a second transmission gate configured to be enabled in response to the inverse of the select signal;
   a first logic gate having input terminals coupled to receive a clock signal on the dedicated routing structure and the select signal, and an output terminal coupled to the first transmission gate; and
   a second logic gate having input terminals coupled to receive a clock signal on the second clock trace and the inverse of the select signal, and an output terminal coupled to the second transmission gate.

8. The programmable logic device of claim 5, wherein the multi-gigabit transceiver comprises a phase locked loop configured to receive the clock signal selected by the first multiplexer.

9. The programmable logic device of claim 8, wherein the multi-gigabit transceiver further comprises a serializer configured to operate in response to a serializing clock signal generated by the phase locked loop in response to the clock signal selected by the first multiplexer.

10. The programmable logic device of claim 1, further comprising:
   a first general-purpose clock pad;
   a first down-level shifter coupled to the first general-purpose clock pad; and
   a general-purpose clock routing path coupling the down-level shifter to the multi-gigabit transceiver.

11. The programmable logic device of claim 10, further comprising a multiplexer coupled to the dedicated routing structure and the general-purpose clock routing path, the multiplexer being configured to selectively route a clock signal on either the dedicated routing structure or the general-purpose clock routing path in response to a select signal.

12. The programmable logic device of claim 11, further comprising a first configuration memory cell that is programmable to store and provide the select signal.

13. The programmable logic device of claim 11, wherein the multiplexer comprises:
   a first transmission gate configured to be enabled in response to the select signal;
   a second transmission gate configured to be enabled in response to the inverse of the select signal;
   a first logic gate having input terminals coupled to receive a clock signal on the dedicated routing structure and the select signal, and an output terminal coupled to the first transmission gate; and
   a second logic gate having input terminals coupled to receive a clock signal on the general-purpose clock routing path and the inverse of the select signal, and an output terminal coupled to the second transmission gate.

14. The programmable logic device of claim 11, wherein the multi-gigabit transceiver comprises a phase locked loop configured to receive the clock signal selected by the multiplexer.

15. The programmable logic device of claim 14, wherein the multi-gigabit transceiver further comprises a serializer configured to operate in response to a serializing clock signal generated by the phase locked loop in response to the clock signal selected by the multiplexer.

16. The programmable logic device of claim 1, wherein the multi-gigabit transceiver comprises a physical media access (PMA) sublayer and a physical coding sublayer (PCS).

17. The programmable logic device of claim 16, further comprising means for routing a clock signal on the dedicated routing structure to a phase locked loop in the PMA as a PMA reference clock signal.

18. The programmable logic device of claim 17, further comprising a down-level shifter configured to receive the PMA reference clock signal, and in response, provide a PCS reference clock signal to the PCS.

19. The programmable logic device of claim 1, wherein the first pair of clock pads is located near the center of an edge of the programmable logic device.

20. A method of operating a programmable logic device, the method comprising:
   applying a first clock signal to a first pair of clock pads of the programmable logic device;
   routing the first clock signal on dedicated routing resources from the first pair of clock pads to a multi-gigabit transceiver located on the programmable logic device;
   using the first clock signal to control the multi-gigabit transceiver;
   applying a second clock-signal to a general-purpose clock pad of the programmable logic device;
   routing the second clock signal from the general-purpose clock pad through clock routing resources of the programmable logic device to the multi-gigabit transceiver; and
   selecting either the first clock signal or the second clock signal to control the multi-gigabit transceiver.

21. The method of claim 20, wherein the first clock signal is a differential clock signal at the first pair of clock pads.

22. The method of claim 21, wherein the first clock signal exhibits jitter of less than 40 picoseconds peak-to-peak.

23. The method of claim 20, further comprising:
   operating core logic of the programmable logic device in response to a core voltage supply;
   operating an I/O region of the programmable logic device in response to an I/O voltage supply, wherein the I/O voltage supply is greater than the core voltage supply; and
   routing the first clock signal at a signaling level corresponding with the I/O voltage supply.

24. The method of claim 20, further comprising:
   programming a configuration memory cell of the programmable logic device to store a select value; and
   selecting either the first clock signal or the second clock signal in response to the select value.

25. The method of claim 20, wherein the second clock signal is a single-ended clock signal.

26. The method of claim 20, further comprising routing the first clock signal to a phase locked loop in a physical media access (PMA) sublayer of the multi-gigabit transceiver as a PMA reference clock signal.

27. The method of claim 26, further comprising converting the PMA reference clock signal to a lower voltage signal for use in a physical coding sublayer (PCS) of the multi-gigabit transceiver.

28. A programmable logic device comprising:
   means for applying a first clock signal to a first pair of clock pads of the programmable logic device;
   dedicated means for routing the first clock signal from the first clock pad to a multi-gigabit transceiver located on the programmable logic device;
   means for using the first clock signal to control the multi-gigabit transceiver;
   means for applying a second clock signal to a general-purpose clock pad of the programmable logic device;
   means for routing the second clock signal from the general-purpose clock pad through clock routing resources of the programmable logic device to the multi-gigabit transceiver; and
   means for selecting either the first clock signal or the second clock signal to control the multi-gigabit transceiver.

29. The programmable logic device of claim 28, wherein the first clock signal is a differential clock signal at the first clock pad.

30. The programmable logic device of claim 29, wherein the first clock signal exhibits jitter of less than 40 picoseconds peak-to-peak.

31. The programmable logic device of claim 28, further comprising;
   means for operating core logic of the programmable logic device in response to a core voltage supply;

means for operating an I/O region of the programmable logic device in response to an I/O voltage supply, wherein the I/O voltage supply is greater than the core voltage supply; and means for routing the first clock signal at a signaling level corresponding with the I/O voltage supply.

32. The programmable logic device of claim 28, further comprising:

means for programming a configuration memory cell of the programmable logic device to store a select value; and means for selecting either the first clock signal or the second clock signal in response to the select value.

33. The programmable logic device of claim 28, wherein the second clock signal is a single-ended clock signal.

34. The programmable logic device of claim 28, further comprising means for routing the first clock signal to a phase locked loop in a physical media access (PMA) sublayer of the multi-gigabit transceiver as a PMA reference clock signal.

35. The programmable logic device of claim 34, further comprising means for converting the PMA reference clock signal to a lower voltage signal for use in a physical coding sublayer of the multi-gigabit transceiver.

36. A system, comprising:

a programmable logic device including:
 programmable input/output circuitry,
 programmable core logic coupled to the programmable input/output circuitry,
 a multi-gigabit transceiver coupled to the programmable core logic,
 a first pair of clock pads, and
 a dedicated routing structure connecting the first pair of clock pads and the multi-gigabit transceiver via a first multiplexer, wherein the first multiplexer comprises:
  a first transmission gate configured to be enabled in response to a select signal;
  a second transmission gate configured to be enabled in response to the inverse of the select signal;
  a first logic gate having input terminals coupled to receive a clock signal on the dedicated routing structure and the select signal, and an output terminal coupled to the first transmission gate; and
  a second logic gate having input terminals coupled to receive a clock signal on the second clock trace and the inverse of the select signal, and an output terminal coupled to the second transmission gate.

37. The system of claim 36, wherein the dedicated routing structure comprises:

a differential buffer coupled to the first pair of clock pads; and a first clock trace providing a connection between the differential buffer and the multi-gigabit transceiver.

38. The system of claim 36, wherein the programmable logic device further comprises:

a second pair of clock pads; and a second dedicated routing structure connecting the second pair of clock pads and the multi-gigabit transceiver.

39. The system of claim 38, wherein the second dedicated routing structure comprises:

a second differential buffer coupled to the second pair of clock pads; and a second clock trace providing a connection between the second differential buffer and the multi-gigabit transceiver.

40. The system of claim 39, wherein the first multiplexer is coupled to the first and second clock traces, the first multiplexer being configured to selectively route a clock signal on either the first or second clock trace in response to a select signal.

41. The system of claim 40, wherein the programmable logic device further comprises a programmable connection between the programmable core logic and the first multiplexer, wherein the programmable core logic provides the select signal to the first multiplexer.

42. The system of claim 40, wherein the multi-gigabit transceiver comprises a phase locked loop configured to receive the clock signal selected by the first multiplexer.

43. The system of claim 42, wherein the multi-gigabit transceiver further comprises a serializer configured to operate in response to a serializing clock signal generated by the phase locked loop in response to the clock signal selected by the first multiplexer.

44. The system of claim 36, wherein the programmable logic device further comprises:

a first general-purpose clock pad;

a first down-level shifter coupled to the first general-purpose clock pad; and a general-purpose clock routing path coupling the down-level shifter to the multi-gigabit transceiver.

45. The system of claim 44, wherein the programmable logic device further comprises a multiplexer coupled to the dedicated routing structure and the general-purpose clock routing path, the multiplexer being configured to selectively route a clock signal on either the dedicated routing structure or the general-purpose clock routing path in response to a select signal.

46. The system of claim 45, wherein the programmable logic device further comprises a first configuration memory cell that is programmable to store and provide the select signal.

47. The system of claim 45, wherein the multiplexer comprises:

a first transmission gate configured to be enabled in response to the select signal;

a second transmission gate configured to be enabled in response to the inverse of the select signal;

a first logic gate having input terminals coupled to receive a clock signal on the dedicated routing structure and the select signal, and an output terminal coupled to the first transmission gate; and a second logic gate having input terminals coupled to receive a clock signal on the general-purpose clock routing path and the inverse of the select signal, and an output terminal coupled to the second transmission gate.

48. The system of claim 45, wherein the multi-gigabit transceiver comprises a phase locked loop configured to receive the clock signal selected by the multiplexer.

49. The system of claim 48, wherein the multi-gigabit transceiver further comprises a serializer configured to operate in response to a serializing clock signal generated by the phase locked loop in response to the clock signal selected by the multiplexer.

50. The system of claim 36, wherein the multi-gigabit transceiver comprises a physical media access (PMA) sublayer and a physical coding sublayer (PCS).

51. The system of claim 50, wherein the programmable logic device further comprises means for routing a clock signal on the dedicated routing structure to a phase locked loop in the PMA as a PMA reference clock signal.

52. The system of claim 51, wherein the programmable logic device further comprises a down-level shifter configured to receive the PMA reference clock signal, and in response, provide a PCS reference clock signal to the PCS.

53. The system of claim 36, wherein the first pair of clock pads is located near the center of an edge of the programmable logic device.

54. A method of operating a programmable logic device, the method comprising:

applying a first clock signal to a first pair of clock pads of the programmable logic device;

applying a second clock signal to a second pair of clock pads of the programmable logic device; and selectively routing on dedicated routing resources either the first clock signal from the first pair of clock pads or the second clock signal from the second pair of clock pads to a phase locked loop of a multi-gigabit transceiver located on the programmable logic device.

55. The method of claim 54, further comprising:

providing a select value from programmable core logic of the programmable logic device; and selecting the first clock signal or the second clock signal in response to the select value.

56. The method of claim 54, wherein the second pair of clock pads comprises general-purpose clock pads of the programmable logic device.

57. The method of claim 54, further comprising:

programming a configuration memory cell of the programmable logic device to store a select value; and selecting either the first clock signal or the second clock signal in response to the select value.

58. The method of claim 57, wherein the second clock signal is a single-ended clock signal.

* * * * *